March 3, 1931.  J. S. TOWNSEND  1,795,058

AUTOMATIC MECHANICAL LOAD BRAKE

Filed March 27, 1926    2 Sheets-Sheet 1

Inventor
John S. Townsend
By Fred Gerlach
Atty.

March 3, 1931.　　　J. S. TOWNSEND　　　1,795,058
AUTOMATIC MECHANICAL LOAD BRAKE
Filed March 27, 1926　　　2 Sheets-Sheet 2
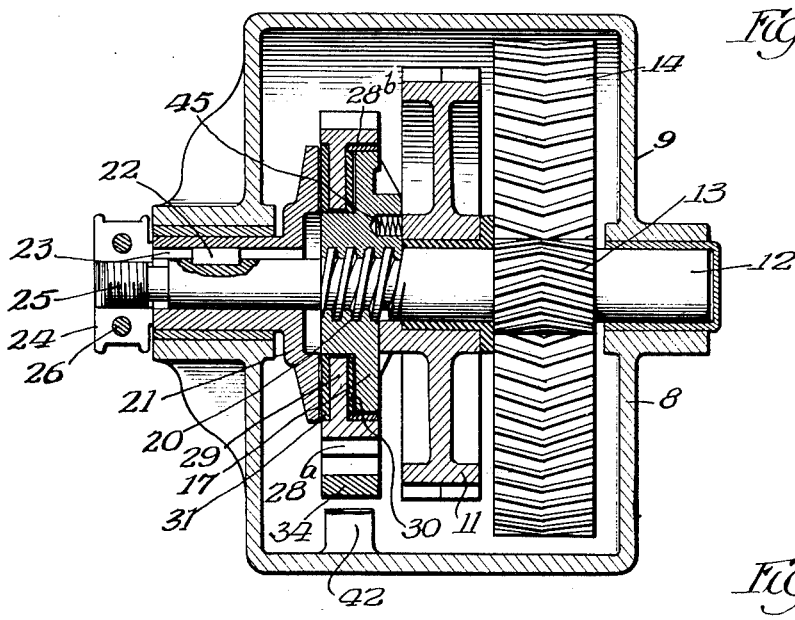
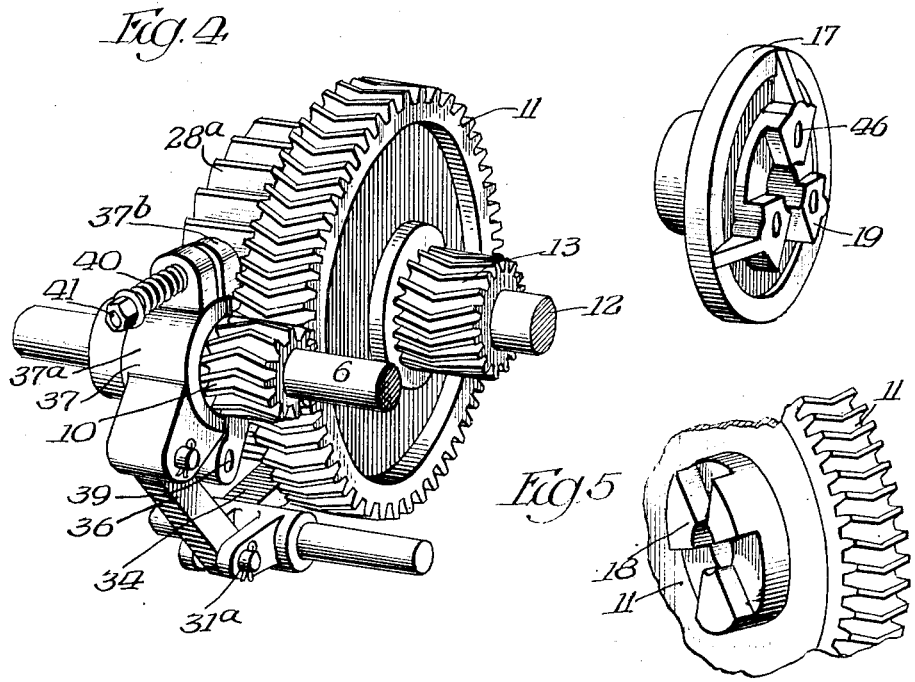

Patented Mar. 3, 1931

1,795,058

UNITED STATES PATENT OFFICE

JOHN S. TOWNSEND, OF HARVEY, ILLINOIS, ASSIGNOR TO WHITING CORPORATION, OF HARVEY, ILLINOIS, A CORPORATION OF ILLINOIS

AUTOMATIC MECHANICAL LOAD BRAKE

Application filed March 27, 1926. Serial No. 97,836.

The invention relates to automatic mechanical load brakes of the type employed in motor-operated travelling cranes, to prevent the load from dropping or accelerating in event the solenoid brake, for controlling the load, should fail to operate or the electric circuit should be out of commission.

In automatic mechanical load-brakes of the friction-disk type, in which the motor driven gear is loosely mounted on the brake and pinion shaft, and is drivably connected to the friction-disk or brake-member that is axially movable by the shaft for braking purposes, it has been found that when the gear and shaft are movable axially relatively to each other the operation of the brake is not uniform or certain. One object of the present invention is to provide a brake of the type under consideration which embodies simple means for locking the gear and shaft against relative axial movement so as to insure a positive and uniform operation of the brake. This means comprises axially interlocking teeth between the motor-driven pinion and the loose gear on the brake-shaft and between the pinion rigid with the brake-shaft and the gear on the hoisting drum.

Another object of the invention is to provide a brake of the aforementioned type which comprises a worm or screw on the shaft for automatically shifting one of the friction disks relatively to the other to apply and release the brake, and embodies means for preventing backlash between the worm on the brake-shaft and the disk shiftable thereby.

Other objects of the invention and the various advantages and characteristics of the present load brake construction will be apparent from a consideration of the following detailed description.

The invention consists in the several novel features hereinafter set forth and more particularly defined by the claims at the conclusion hereof.

Figure 1:
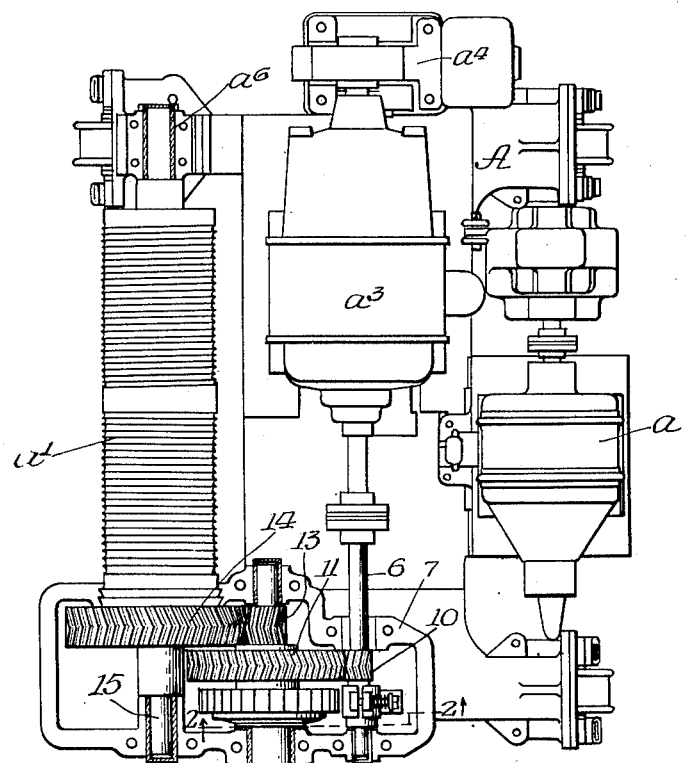
Figure 2:
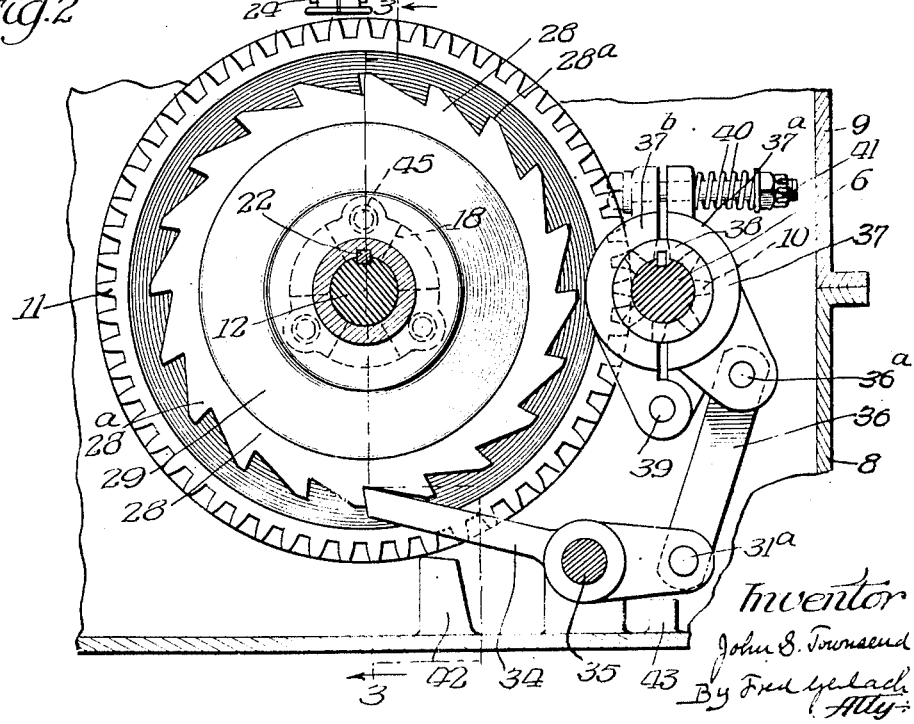

In the drawings: Fig. 1 is a plan of a hoisting mechanism provided with a load brake embodying the invention, the gear-case cover of the brake being removed for purposes of illustration. Fig. 2 is a section taken on the line 2—2 of Fig. 1. Fig. 3 is a section taken on the line 3—3 of Fig. 2. Fig. 4 is a perspective of the braking mechanism. Fig. 5 is a detail perspective of the loose gear on the brake-shaft. Fig. 6 is a detail perspective of the axially movable friction-disk or brake-member.

The invention is exemplified in a hoisting crane comprising a wheeled truck A, which is adapted to run on overhead rails; an electric motor $a$ for driving suitable gearing for propelling the truck; a hoisting drum $a'$, for operating a hoisting cable; an electric motor $a^3$ for operating the drum and cable to lift a load and a solenoid brake $a^4$ for controlling the lowering of the load; all of which may be of usual construction and as well understood in the art.

The shaft of motor $a^3$ is coupled to drive a shaft 6 which is journalled in a gear-case 7 adapted to contain lubricant, so the gearing therein will run in oil. Said gear-case comprises a lower section 8 which may be integral with the truck-frame and a removable cover-section 9. Shaft 6 is connected to drive the hoisting drum $a'$ through speed-reducing gearing comprising a pinion 10 fixed to said shaft; a gear 11 journalled on a brake-shaft 12; a pinion 13 integral with shaft 12; and a gear 14 fixed to rotate with the hoisting drum $a'$ which is mounted on a shaft 15. One end of shaft 15 is journalled in gear-case 7. The other end is journalled in a bearing $a^6$ carried by the truck-frame. Pinion 10 and gear 11 have intermeshing V-shaped or herring-bone teeth, so that the gear 11 will be held against axial movement relatively to the shaft 12 by said pinion. Pinion 13 which is integral with shaft 12, and gear 14 with which pinion 13 meshes, are also formed with interfitting V-shaped or herring-bone teeth, so that pinion 13 and its shaft 12 will be held thereby against axial movement. Gear 11 is connected to shaft 12 through a brake-member 17. The contiguous faces of gear 11 and member 17 are provided with interfitting lugs 18 and 19 respectively, to lock rotatively said gear and member together and to permit limited axial movement of the member to render the brake effective to brake the load. The hub of member 17 is threaded to a worm or screw 20 which is formed on the shaft 12 adjacent one side of gear 11. This screw 20 operates as hereinafter described to shift the member axially in order to apply the brake. Springs 45 are held in sockets 46 which are formed in the face of member 17 that is contiguous to gear 11, and operate to press yieldingly said member and gear apart. These springs eliminate backlash between the shaft 12 and member 17 and also accelerate the shift of said member 17 to its braking position. In the operation of the brake, gear 11 and shaft 12 will be controlled against relative axial movement by the interlock between gear 11 and pinion 10 and gear 14 and pinion 13 respectively, while member 17 is free to move axially. This, in practice, has been found to render the application of the brake certain and accurate, and to retain the gears truly positioned without undue friction. A complementary adjustable brake-member 21 is mounted on and connected to rotate with the shaft 12. A key 22 on shaft 12 is slidable in a key-way 23 in the hub of member 21, to permit axial adjustment of the member 21 relatively to member 17. A split collar 24 is threaded to a screw 25 on one end of shaft 12 to adjust the position of member 21 on shaft 12 and relatively to member 17, and is provided with clamp-bolts 26 by which it may be secured in its assigned position. An axially movable ratchet-wheel 28 with teeth 28$^a$ comprises a body 29 which is loosely mounted on the hub portion of brake-members 17. Said body is provided with friction-washers or faces 30 and 31 on its opposite faces which are adapted to be engaged by contiguous friction-faces of the members 17 and 21 respectively, so that by bringing said members together, the ratchet-wheel, when held against rotation, will stop the rotation of said members and the parts rotatable therewith, including the hoisting drum $a'$. A bushing or liner 28$^b$, usually of bronze, is provided in the rim of ratchet 28 to form a bearing between the periphery of member 17 and the ratchet. Ratchet-teeth 28$^a$ are adapted to be engaged by a dog 34 to prevent its rotation in one direction when the brake is to be applied to the load. This dog is pivoted at 35, at the bottom of the gear-case, and is adapted as hereinafter described to be automatically shifted into its operative position with respect to the ratchet wheel. While load is being lifted by the rotation of the drum $a'$, the dog is adapted to be disengaged from the ratchet so the latter will be free to rotate. The device for controlling dog 34 comprises a link 36 pivoted to the dog at 31$^a$ and at 36$^a$ to a friction collar 37 which is mounted on a bushing 38 which is fixed to rotate with the drive-shaft 6. Said collar comprises a pair of sections 37$^a$ and 37$^b$ which are pivoted together at 39 and are frictionally held against the bushing 38 by a spring 40 around a bolt 41, which extends through lugs on said sections, so that the collar will be automatically and frictionally operated to disengage the dog 34 from the rachet 28 when the drum $a'$ is being operated in the load lifting direction, and to automatically shift the dog into engagement with the ratchet 28 when the drum $a'$ and its load are not under the restraint of the motor-shaft, or when the direction of rotation of the drum is reversed. Stops 42 and 43 are provided on casing-section 9 to limit positively the throw of the dog 34 and the collar 37.

When a load is being lifted, the motor $a$ will rotate shaft 6 in that direction which will cause collar 37 to disengage dog 34 from ratchet wheel 28 so that the latter will be free to rotate and pinion 10 will drive gear 11. The load applied to shaft 12 through the medium of the gear 14 and pinion 13 will, through worm 20, force member 17 axially to clamp the brake-wheel against the brake-member 21 and thereupon establish a driving connection between gear 11 and shaft 12. This driving connection between gear 11 and shaft 12 permits rotation of shaft 6 to be imparted to the hoisting drum for load lifting purposes. When the motor $a$ is stopped, the load maintains the clamped relation of the brake-members and ratchet wheel and tends to rotate shaft 12 in a reverse direction. This reverse rotation is in turn imparted to shaft 6 and operates to effect shift of the dog 34 into engagement with the ratchet wheel 28. Upon engagement of the dog with the ratchet wheel, said wheel is locked against rotation and serves to brake the load. When it is desired to lower the load, motor $a$ is driven in the opposite direction and maintains engagement of the dog with the ratchet wheel. As a result of the reverse rotation of the motor, gear 11 is rotated in such a manner that brake-member 17 is caused to be shifted out of its clamped relation with brake-member 21 and ratchet wheel 29. This releases the brake and permits the load to drop by its own weight. As soon as motor $a$ is stopped, the load again operates through worm or screw 20 to force member 17 into clamped relation with the ratchet wheel 29 and brake-member 17. Inasmuch as the dog 34 holds the ratchet wheel against rotation, the brake is applied and instantaneously brakes the load.

A characteristic of the construction set forth is that the shaft 12 and gear 11 are held against axial movement by the axially interlocked gear-teeth on pinion 10 and wheels 14 respectively, to insure and accurately control the relative movements necessary in applying the brake to the load. Another characteristic is that gear 11 and brake-member 17 are pressed apart to insure the movement of said member into its brake-operating position and to eliminate back-lash between the worm 20 and the hub of said member.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an automatic mechanical load brake, the combination of a power-shaft, a brake-shaft operatively connected to the load, a pinion fixed on the power-shaft, a gear mounted loosely on the brake-shaft and meshing with the pinion, a pair of brake-members on the brake-shaft, one of said members being coupled to rotate with the gear and shiftable axially relatively thereto, the other member being fixed to the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the gear and said brake-shaft, and means for automatically locking the wheel against rotation for load braking purposes, the pinion and gear being interlocked axially so as to prevent said gear from moving axially on the brake-shaft and relatively to the fixed brake-member.

2. In an automatic mechanical load brake, the combination of a power-shaft, a brake-shaft operatively connected to the load, a pinion fixed on the power-shaft, a gear mounted loosely on the brake-shaft and meshing with the pinion, a pair of brake-members on the brake-shaft, one of said members being coupled to rotate with the gear and shiftable axially relatively thereto, the other member being fixed to the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the gear and said brake-shaft, and means for automatically locking the wheel against rotation for load braking purposes, the interengaging teeth on the pinion and gear being shaped so as to interlock axially and thereby prevent said gear from moving axially on the brake-shaft and relatively to the fixed brake-member.

3. In an automatic mechanical load brake, the combination of a power-shaft, a hoisting drum, a shaft for said drum, a brake-shaft, a pinion on the power-shaft, a gear mounted loosely on the brake-shaft and meshing with said pinion, a pinion fixed to the brake-shaft, a gear fixed to the drum-shaft and meshing with the pinion on the brake-shaft, a pair of brake-members on the brake-shaft, one of said members being coupled to rotate with the loose gear and shiftable axially relatively thereto, the other member being fixed to the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the loose gear and said brake-shaft, and means for automatically locking the wheel against rotation for load braking purposes, the pinion on the brake-shaft and the gear on the drum-shaft being axially interlocked so as to prevent the brake-shaft, together with the fixed brake-member, from being displaced axially.

4. In an automatic mechanical load brake, the combination of a power-shaft, a hoisting drum, a shaft for said drum, a brake-shaft, a pinion on the power-shaft, a gear mounted loosely on the brake-shaft and meshing with said pinion, a pinion fixed to the brake-shaft, a gear fixed to the drum-shaft and meshing with the pinion on the brake-shaft, a pair of brake-members on the brake-shaft, one of said members being coupled to rotate with the loose gear and shiftable axially relatively thereto, the other member being fixed to the brake-shaft, an axially movable wheel mounted loosely around the brake-shaft and disposed between the brake members, a screw connection between the brake-shaft and the axially shiftable brake-member for shifting the latter into clamped relation with the wheel and fixed brake-member and effecting a driving connection between the loose gear and said brake-shaft, and means for automatically locking the wheel against rotation for load braking purposes, the interengaging teeth of the pinion on the brake-shaft and the gear on the drum-shaft being shaped so as to interlock axially and thereby prevent the brake-shaft, together with the fixed brake-member, from being displaced axially.

5. In an automatic mechanical load brake, the combination of a power-shaft, a hoisting drum, a shaft for said drum, a brake-shaft, a pinion on the power-shaft, a gear mounted loosely on the brake-shaft and meshing with said pinion, a pinion fixed to the brake-shaft, a gear fixed to the drum-shaft and meshing with the pinion on the brake-shaft, a pair of brake-members on the brake-shaft, one of said members being coupled to rotate with the loose gear and shiftable axially relatively thereto, the other member being fixed to the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the loose gear and said brake-shaft, and means for automatically locking the wheel against rotation for load braking purposes, the pinion on the brake-shaft and the gear on the drum-shaft being interlocked axially so as to prevent the brake-shaft, together with the fixed brake-member, from being displaced axially, the pinion on the power-shaft and the loose gear being also interlocked axially so as to prevent said loose gear from moving axially on the brake-shaft and relatively to the fixed brake-member.

6. In an automatic mechanical load brake, the combination of a power-shaft, a hoisting drum, a shaft for said drum, a brake-shaft, a pinion on the power-shaft, a gear mounted loosely on the brake-shaft and meshing with said pinion, a pinion fixed to the brake-shaft, a gear fixed to the drum-shaft and meshing with the pinion on the brake-shaft, a pair of brake-members on the brake-shaft, one of said members being coupled to rotate with the loose gear and shiftable axially relatively thereto, the other member being fixed to the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the loose gear and said brake-shaft, and means for automatically locking the wheel against rotation for load braking purposes, the interengaging teeth of the pinion on the brake-shaft and the gear on the drum-shaft being shaped so as to interlock axially and thereby prevent the brake-shaft, together with the fixed brake-member from being displayed axially, the interengaging teeth of the pinion on the power-shaft and the loose gear being similarly shaped so as to interlock axially and prevent said loose gear from being displaced axially on the brake-shaft and relatively to said fixed brake-member.

7. In an automatic mechanical load brake, the combination of a power-shaft, a brake-shaft operatively connected to the load, a pinion fixed on the power-shaft, a gear mounted loosely on the brake-shaft, a pair of brake-members on the brake-shaft, one of said members being coupled to rotate with the gear and shiftable axially relatively thereto, the other member being fixed to rotate with the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the gear and said brake-shaft, and resilient spreading means between said axially shiftable brake-member and the gear.

8. In an automatic mechanical load brake, the combination of a power-shaft, a brake-shaft operatively connected to the load, a pinion fixed on the power-shaft, a gear mounted loosely on the brake-shaft, a pair of brake-members on the brake-shaft, one of said members being coupled to rotate with the gear and shiftable axially relatively thereto, the other member being fixed to rotate with and adjustable axially on the brake-shaft, an axially movable wheel mounted loosely around the brake-shaft and disposed between the brake-members, a screw connection between the brake-shaft and the axially shiftable brake-member for shifting the latter into clamped relation with the wheel and fixed brake-member and effecting a driving connection between the gear and said brake-shaft, and spreader springs between said axially shiftable brake-member and the gear.

Signed at Harvey, Illinois, this tenth day of March, 1926.

JOHN S. TOWNSEND.